(12) United States Patent
Ammar et al.

(10) Patent No.: US 10,710,499 B1
(45) Date of Patent: Jul. 14, 2020

(54) LIGHT ASSEMBLY WITH HOUSING HAVING COVER PROVIDING FOR WIRE PASSAGE

(71) Applicant: Ford Global Technologies, LLC, Dearborn, MI (US)

(72) Inventors: Ali Ammar, Dearborn, MI (US); Steven J. Antilla, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/445,559

(22) Filed: Jun. 19, 2019

(51) Int. Cl.
| | | |
|---|---|---|
| *B60Q 1/26* | (2006.01) | |
| *B60Q 3/51* | (2017.01) | |
| *F21V 23/00* | (2015.01) | |
| *F21V 15/01* | (2006.01) | |
| *B60Q 3/217* | (2017.01) | |
| *F21V 3/02* | (2006.01) | |
| *B60Q 3/70* | (2017.01) | |
| *B60Q 3/20* | (2017.01) | |
| *B60Q 3/30* | (2017.01) | |

(52) U.S. Cl.
CPC ............. *B60Q 3/51* (2017.02); *B60Q 3/217* (2017.02); *F21V 3/02* (2013.01); *F21V 15/01* (2013.01); *F21V 23/001* (2013.01); *B60Q 3/20* (2017.02); *B60Q 3/30* (2017.02); *B60Q 3/70* (2017.02)

(58) Field of Classification Search
CPC ...... F21V 15/01; F21V 17/164; F21V 23/004; F21V 23/005; F21V 23/007; F21S 8/03; F21S 8/033; F21S 41/141; F21S 43/14; B60Q 1/24; B60Q 1/2669
See application file for complete search history.

(56) References Cited

U.S. PATENT DOCUMENTS

| | | | | |
|---|---|---|---|---|
| 3,641,481 A | * | 2/1972 | Farrell ...................... | F21S 8/00 439/558 |
| 4,466,050 A | * | 8/1984 | Lockard .................. | G09F 13/04 362/294 |
| 4,812,814 A | * | 3/1989 | Elliott ...................... | G08B 5/36 340/332 |
| 5,121,098 A | * | 6/1992 | Chen .................... | B60Q 1/2696 340/457 |

(Continued)

FOREIGN PATENT DOCUMENTS

CN 102606971 A 7/2012

*Primary Examiner* — Ismael Negron
(74) *Attorney, Agent, or Firm* — David Coppiellie; Price Heneveld LLP

(57) ABSTRACT

A light assembly includes a housing with a mounting bracket extending from an upper surface, a circuit board, a light source provided on the circuit board, and a cover with an aperture in a bottom surface for light from the light source to pass through. The housing includes a side wall defining an interior space configured to receive the circuit board, and a plurality of cutouts formed in the sidewall. The cover includes a tab and at least one cap, both extending from the bottom surface of the cover, with the cap extending farther than the tab. The circuit board is positioned in the housing, with the cover closing the interior space such that the tab and cap each coupled to one of the cutouts, the tab and the cutout defining a gap through which wires connected to the circuit board extend, while preventing light from exiting through the cutouts.

20 Claims, 7 Drawing Sheets

(56) References Cited

U.S. PATENT DOCUMENTS

| | | | | |
|---|---|---|---|---|
| 5,388,035 | A | * 2/1995 | Bodem, Jr. | B60Q 1/2696 |
| | | | | 362/240 |
| 6,049,163 | A | 4/2000 | Masuda et al. | |
| 6,149,288 | A | * 11/2000 | Huang | B60Q 1/2615 |
| | | | | 362/545 |
| 6,568,833 | B2 | * 5/2003 | Worgan | B64D 47/06 |
| | | | | 362/247 |
| 7,093,964 | B2 | * 8/2006 | Bynum | B60Q 3/51 |
| | | | | 362/488 |
| 7,128,452 | B2 | * 10/2006 | Tsai | B60Q 1/2607 |
| | | | | 362/497 |
| 7,727,009 | B2 | * 6/2010 | Goto | F21V 5/04 |
| | | | | 362/396 |
| 8,282,252 | B2 | * 10/2012 | Ichikawa | B60Q 3/14 |
| | | | | 362/471 |
| 9,719,657 | B2 | * 8/2017 | McKendry | B60Q 1/2696 |
| 2005/0128761 | A1 | * 6/2005 | Wu | B60Q 1/32 |
| | | | | 362/498 |
| 2006/0092649 | A1 | 5/2006 | Bynum | |
| 2006/0092659 | A1 | 5/2006 | Bynum | |

* cited by examiner

LIGHT ASSEMBLY WITH HOUSING HAVING COVER PROVIDING FOR WIRE PASSAGE

FIELD OF THE DISCLOSURE

The present disclosure generally relates to vehicle lighting, and more particularly to a vehicle light assembly.

BACKGROUND OF THE DISCLOSURE

Vehicle lighting assemblies may be provided on vehicle doors or on other areas of vehicles to improve occupant visibility. In some instances it may be desirable to provide a lighting assembly that can be used in both a right-hand or left-hand configuration.

SUMMARY OF THE DISCLOSURE

According to one aspect of the present disclosure, a vehicle light assembly is provided herein. The vehicle light assembly includes a circuit board. A light source is operably connected to the circuit board; and one or more wires extend from the circuit board. A housing is also provided. The housing includes an upper surface. The housing also includes a mounting bracket extending from the upper surface for attaching the housing to a vehicle. The housing includes at least one side wall defining an interior space; the interior space is configured to receive the circuit board. The at least one side wall defines a first cutout and a second cutout opposite the first cutout. A cover is provided comprising a bottom surface. The bottom surface defines an aperture. The cover has a tab extending upward from the bottom surface and a cap extending upward from the bottom surface; the cap is opposite the tab. The cap extends farther than the tab. The cover is configured to selectively couple to the housing such that the tab and the first cutout together define a gap through which the one or more wires extend and the cap couples with the second cutout to prevent light from exiting through the second cutout or such that the tab and the second cutout together define a gap through which the one or more wires extend and the cap couples with the first cutout to prevent light from exiting through the first cutout.

Embodiments of the first aspect of the invention can include any one or a combination of the following features:
- the mounting bracket further comprises one or more elongated protrusions configured to maintain alignment of the housing relative to the vehicle;
- the mounting bracket is configured to attach to a surface substantially transverse to the circuit board;
- the housing further comprises at least one rib configured to maintain horizontal alignment of the circuit board relative to the housing;
- the at least one rib further comprises at least one abutment configured to maintain a vertical clearance of the circuit board relative to the housing;
- the housing further comprises a recess formed in an interior surface of the housing and configured to accommodate one or more electrical components of the circuit board;
- the housing further comprises one or more braces provided on an interior surface of the housing and configured to contact the cover during assembly to maintain vertical clearance of the cover relative to the housing;
- the one or more braces are configured to overlap with the sides of the tab and/or the cap to prevent light from escaping from cracks defined between the housing and the cover; and
- the cover further comprises a cavity for partially receiving the circuit board.

According to another aspect of the present disclosure, a vehicle light assembly is provided herein. The vehicle light assembly includes a circuit board having a light source operably connected to the circuit board and one or more wires extending from the circuit board. The vehicle light assembly further includes a housing. The housing includes an upper surface, a mounting bracket extending from the upper surface for attaching the housing to a vehicle, and at least one side wall defining an interior space configured to receive the circuit board. The at least one side wall defines a plurality of cutouts, the plurality of cutouts comprising one designated cutout and one or more non-designated cutouts. The vehicle light assembly further includes a cover. The cover includes a bottom surface defining an aperture, a tab extending upward from the bottom surface, and one or more caps extending upward from the bottom surface and opposite the tab. The one or more caps extend farther than the tab. The cover and the circuit board are configured to selectively couple to the housing such that the tab and the designated cutout together define a gap through which the one or more wires extend and the one or more caps couple with the one or more non-designated cutouts to prevent light from exiting through the one or more non-designated cutouts.

Embodiments of the second aspect of the invention can include any one or a combination of the following features:
- the mounting bracket extends from the housing at an angle relative to the circuit board to direct light emitted from the vehicle light assembly in a desired direction;
- the mounting bracket further comprises an opening for receiving a fastener comprising a chamfer along a portion of the periphery of the opening for directing the fastener through the opening during assembly;
- the mounting bracket further comprises one or more elongated protrusions configured to maintain alignment of the housing relative to the vehicle; and
- the housing and the cover are configured to couple together such that the circuit board is completely enclosed.

According to yet another aspect of the present disclosure, a vehicle light assembly is provided herein. The vehicle light assembly includes a housing. The housing includes an upper surface, a mounting bracket extending from the upper surface for attaching the housing to a vehicle, and at least one side wall defining an interior space configured to receive a circuit board. The at least one side wall defines a plurality of cutouts wherein the plurality of cutouts comprises one designated cutout and one or more non-designated cutouts. The housing also includes a cover. The cover includes a bottom surface defining an aperture, a tab extending upward from the bottom surface, and one or more caps extending upward from the bottom surface. The one or more caps extend farther from the bottom surface than the tab. The cover is configured to couple to the housing in a plurality of configurations such that the tab and the designated cutout together define a gap through which one or more wires may extend and the one or more caps couple with the non-designated cutouts to prevent light from exiting through the non-designated cutouts.

Embodiments of the third aspect of the invention can include any one or a combination of the following features:
- the housing further comprises one or more first attachment features symmetrically positioned about the housing and the cover further comprises a plurality of second attachment features symmetrically positioned about the cover wherein the plurality of second attachment features are configured to couple to the one or more first attachment features in a plurality of orientations of the cover relative to the housing;

the housing further comprises one or more braces provided on an interior surface of the housing and configured to maintain the position of the cover relative to the housing wherein the sides of the one or more braces are configured to overlap the sides of the tab and the one or more caps to prevent light from exiting through cracks formed between the housing and the cover;

the tab and the one or more caps extend away from the cover and overlap with the at least one side wall to prevent light from exiting through cracks formed between the housing and the cover;

the at least one side wall extends beyond the sides of the cover to prevent light from exiting through cracks formed between the housing and the cover; and the cover further comprises a cavity configured to partially receive a circuit board.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
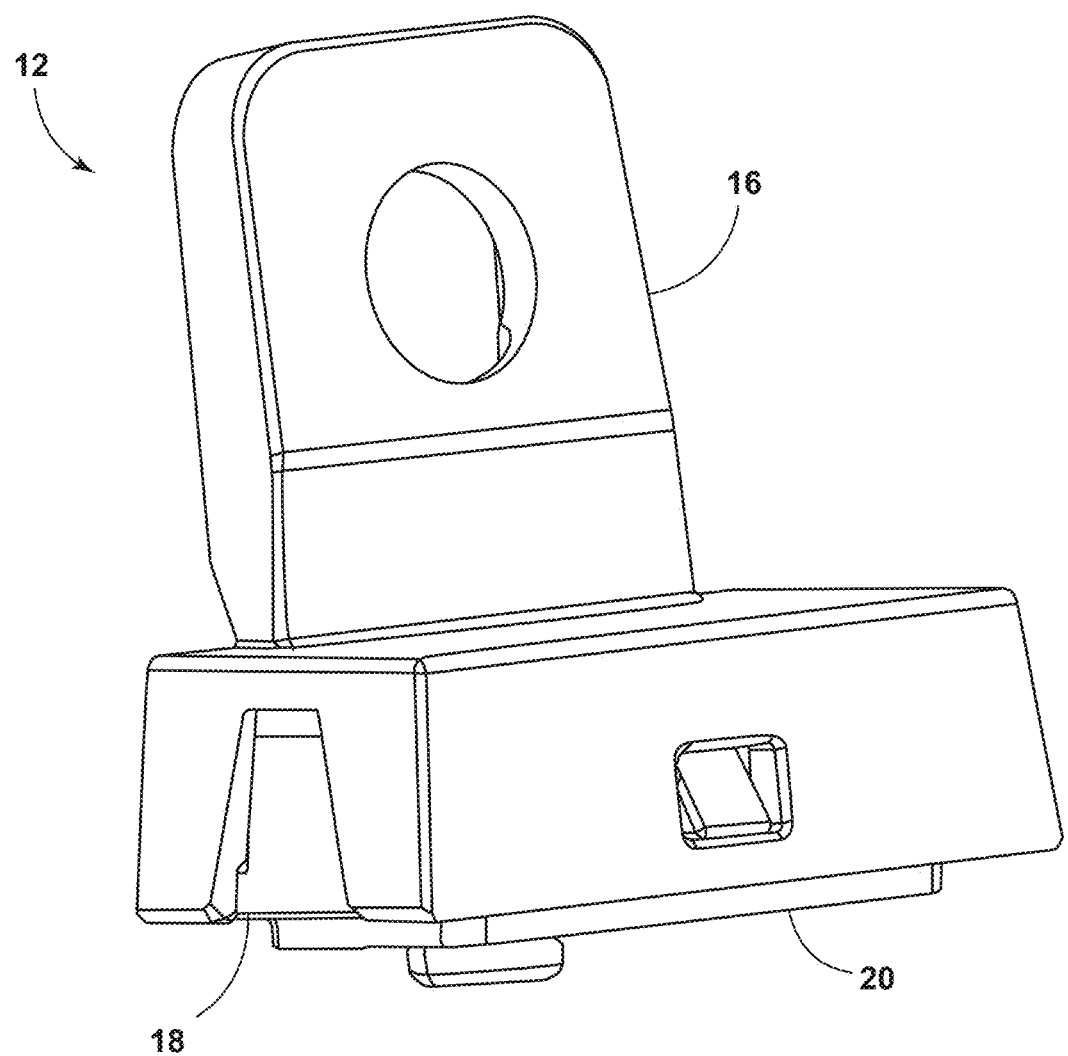
FIG. 2 is a front perspective view of a light assembly, according to one embodiment.

For purposes of description herein, the terms "upper," "lower," "right," "left," "rear," "front," "vertical," "horizontal," and derivatives thereof shall relate to the disclosure as oriented in FIG. 2. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The following disclosure describes a light assembly for a vehicle as provided herein. The light assembly may include a circuit board, a housing, and a cover. A light source is operably connected to the circuit board and one or more wires extend from the circuit board. The housing includes an upper surface and at least one side wall defining an interior space. The interior space is configured to receive the circuit board. The housing also includes a mounting bracket extending from the housing for attaching the housing to a vehicle. The at least one side wall defines a first cutout and a second cutout opposite the first cutout. The housing is configured to selectively receive the circuit board such that the one or more wires extend through either the first cutout or the second cutout. A cover is provided comprising a bottom surface. The bottom surface defines an aperture for a lens. The cover has a tab extending upward from the bottom surface and a cap extending upward from the bottom surface. The cap extends farther from the bottom surface than the tab. The cover is configured to selectively couple to the housing such that the tab and the first cutout together define a gap through which the one or more wires extend and the cap couples with the second cutout to prevent light from exiting through the second cutout or such that the tab and the second cutout together define a gap through which the one or more wires extend and the cap couples with the first cutout to prevent light from exiting through the first cutout.

Figure 1:
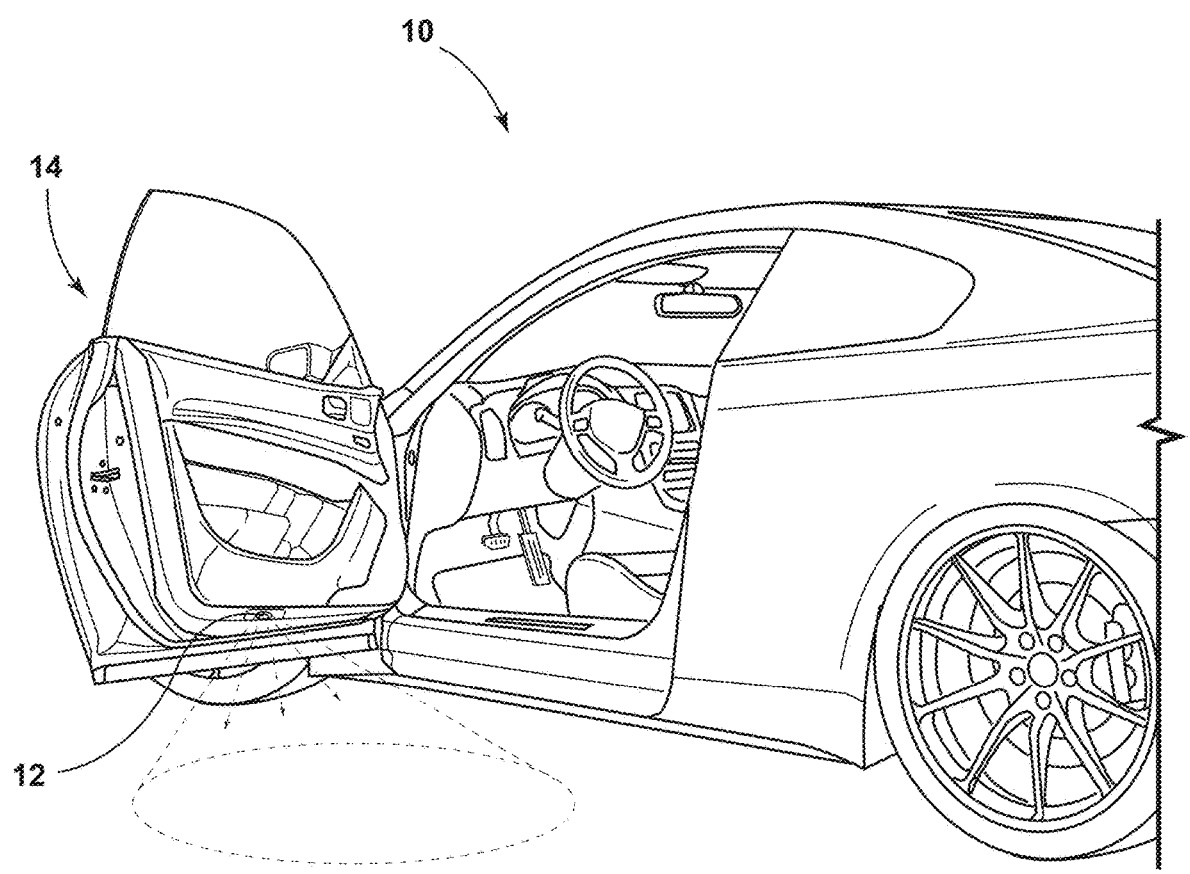
FIG. 1 is a front perspective view of a vehicle having a light assembly within a door panel, according to one example.

Referring to FIG. 1, a vehicle 10 is provided having a passenger compartment. The vehicle 10 is shown as a passenger car although the type of vehicle 10 is not meant to be limiting and the vehicle 10 could additionally be, for example, a minivan, truck, commercial vehicle, or any other motorized vehicle. A light assembly 12 is also shown located on a passenger door 14 of the vehicle 10 for illuminating the ground as a puddle lamp, according to one example. While the light assembly 12 is shown disposed on a passenger door 14 of the vehicle 10 as a puddle lamp, the location of the light assembly 12 is not meant to be limiting and the light assembly 12 could be disposed elsewhere on the vehicle 10 (e.g., within the interior of the vehicle 10, the engine compartment of the vehicle 10, the trunk of the vehicle 10, etc.).

Figure 3:
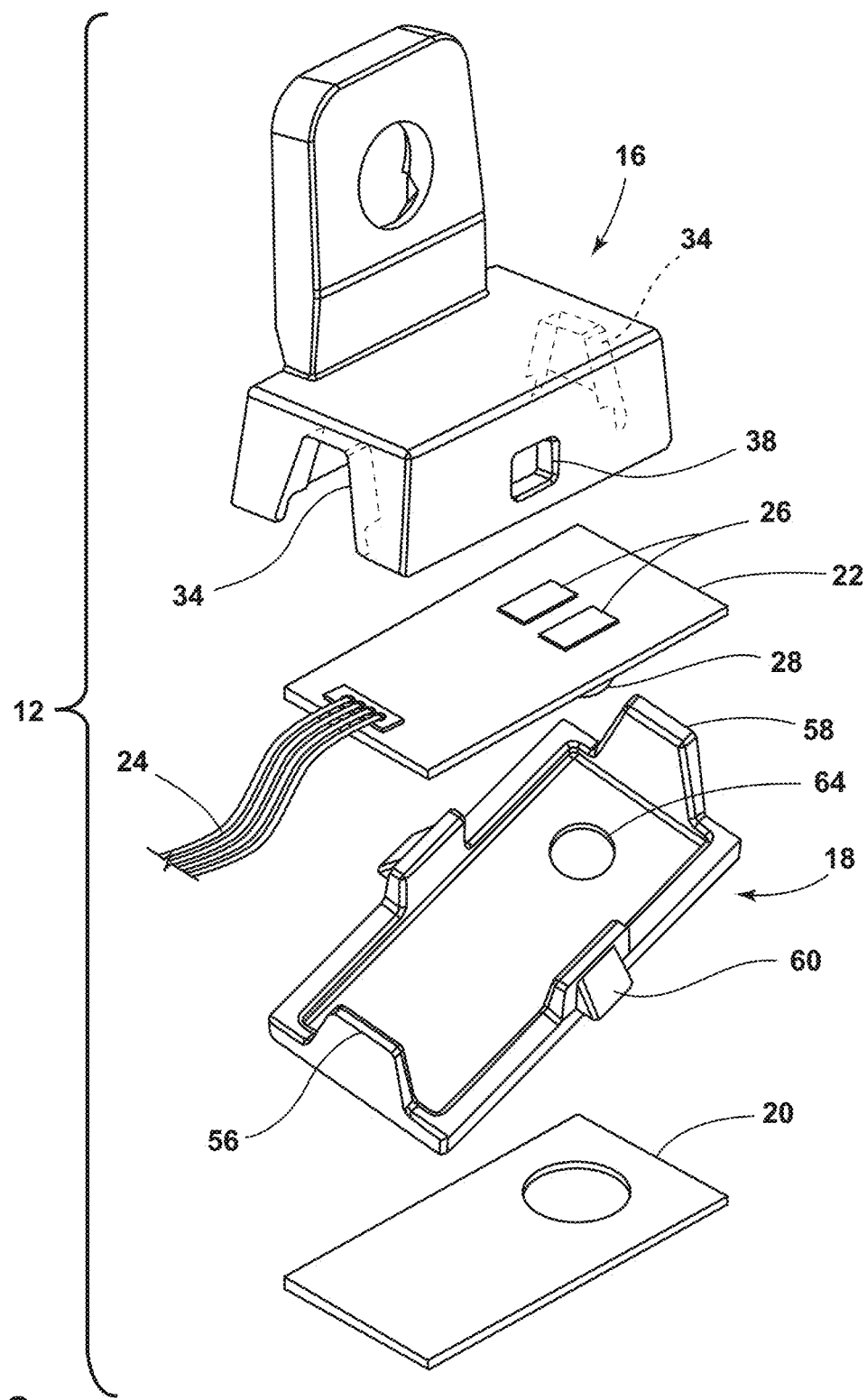
FIG. 3 is an exploded view of a light assembly illustrated in FIG. 2.

Referring to FIGS. 2 and 3, the light assembly 12 is illustrated according to one embodiment. The light assembly 12 includes a housing 16, a circuit board 22, and a cover 18 operably coupled to the housing 16. The housing 16 includes one or more first attachment features 38 configured to couple to one or more second attachment features 60 of the cover 18 such that the housing 16 and the cover 18 are configured to connect together and define an interior space for receiving the circuit board 22. The housing 16 and the cover 18 may be configured to completely enclose the circuit board 22. The housing 16 and the cover 18 further define a gap between one of a plurality of cutouts 34 and a tab 56 through which one or more wires 24 may extend. The remaining cutouts 34 couple with one or more caps 58 to prevent light from exiting through the remaining cutouts 34. Additionally, the one or more first attachment features 38 may be symmetrically positioned on the housing 16 about a substantially vertical axis and the one or more second attachment features 60 may be symmetrically positioned on the cover 18 about a substantially vertical axis such that the cover 18 and the circuit board 22 may be coupled to the housing 16 in a plurality of configurations as they are rotated about a substantially vertical axis relative to the housing 16.

Contemplated structures for use as the circuit board 22 include a printed circuit board (PCB) or another suitable structure. The circuit board 22 is provided as a rectangular circuit board, however, it is contemplated that the circuit board 22 may be any shape and/or size to accommodate the design of the housing 16 and/or cover 18. The circuit board 22 may include one or more electrical components 26 (e.g., resistors, capacitors, integrated circuits) attached to either side of the circuit board 22 and includes one or more wires 24 electrically coupled with the one or more electrical components 26. In addition, the circuit board 22 includes at least one light source 28 mounted thereon on the bottom side and optically coupled with an aperture 64 defined by the cover 18 for providing light to illuminate an area in or proximate to the vehicle 10. Suitable contemplated light sources include, but are not limited to, light emitting diodes (LEDs), organic light emitting diodes (OLEDs), incandescent lights, fluorescent lights, phosphorescent lights, electroluminescent lights, and any other suitable light sources.

The light assembly 12 may be coupled to the vehicle 10 by means of a mounting bracket 30 (FIG. 4) and may additionally include a gasket 20 disposed between the cover 18 and an interior panel of the vehicle 10. The gasket 20 may be configured to prevent the leakage of light from the light assembly 12 and/or reduce noises and vibrations caused between the light assembly 12 and the vehicle 10.

Figure 4:
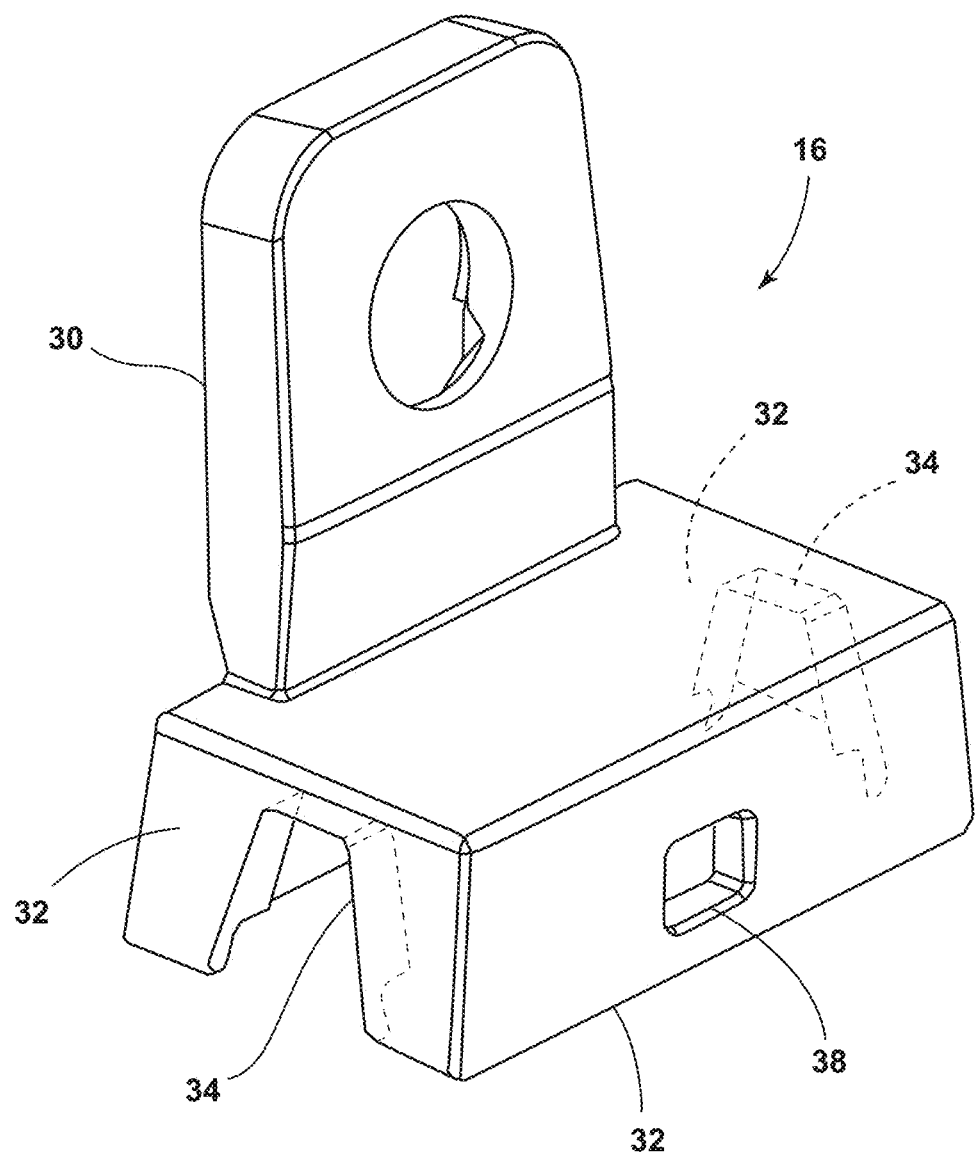
FIG. 4 is a front perspective view of the housing of the light assembly, according to one example.

Referring to FIG. 4, the housing 16 of the light assembly is further illustrated. The housing 16 includes at least one side wall 32 defining the plurality of cutouts 34 comprising a designated cutout through which the one or more wires 24 extend and one or more non-designated cutouts. On the example shown, the housing 16 has four side walls with two opposing side walls 32 on the left and right sides each having a cutout 34. In some embodiments, the cutout 34 is generally U-shaped. The cutouts 34 may include portions removed from the at least one side wall 32 and may be positioned such that the cover 18 may be rotated relative to the housing 16 about a vertical axis to selectively couple with the housing 16 to align the designated cutout with tab 56 of the cover 18 (shown in FIG. 7) to form a gap through which the one or more wires 24 may extend. This allows the light assembly 12 to be used in a variety of configurations (e.g., a left-hand configuration or a right-hand configuration) . The cover 18 and the housing 16 may also be configured such that the one or more non-designated cutouts couple with the one or more caps 58 of the cover 18 to prevent light from escaping through the one or more non-designated cutouts.

The at least one side wall 32 may also define one or more first attachment features 38 for coupling the housing 16 to the cover 18. The one or more first attachment features 38 may be configured to couple to one or more second attachment features 60 of the cover 18 (shown in FIG. 7) such that the cover 18 may couple to the housing 16 in multiple orientations as the cover 18 is rotated relative to the housing 16 about a substantially vertical axis. On the example shown, attachment features are provided on opposing front and rear sides of the housing 16 and cover 18. The first attachment features 38 and the second attachment features 60 may be any suitable structure for fastening a cover and a housing. This may include, but is not limited to, integral attachment features (i.e., snap-fit features), threaded and/or non-threaded holes for receiving a fastener, the use of an adhesive, the use or one or more welds, other means by which the housing 16 and the cover 18 may be coupled, or any combination thereof.

The housing 16 may also include a mounting bracket 30 for attaching the housing 16 to a portion of the vehicle 10. The mounting bracket 30 extends upward from the housing 16 for coupling the light assembly 12 to a surface of the vehicle 10 that is substantially transverse to the circuit board 22. Additionally, it is contemplated that the mounting bracket 30 may extend away from the housing 16 at an angle to direct the light from the light source 28 in a desired direction. It is contemplated that mounting bracket 30 may extend from any surface of housing 16 and/or may include a plurality of mounting brackets extending from one or more surfaces of the housing 16. Alternatively, one or more mounting brackets may extend from the cover 18.

Figure 5:
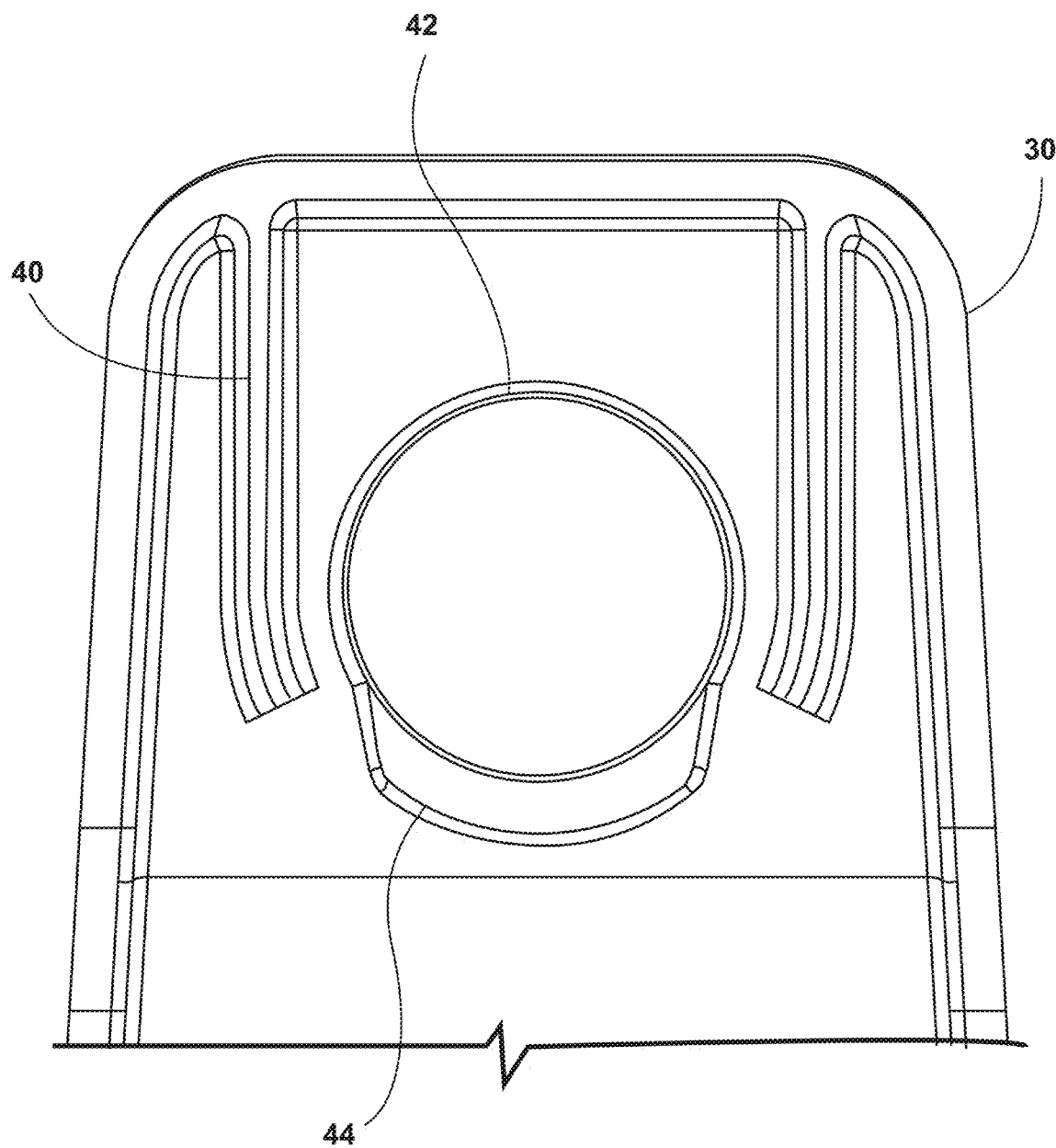
FIG. 5 is an enlarged rear view of a mounting bracket of the housing of FIG. 4.

Referring to FIG. 5, the mounting bracket 30 may include one or more features for attaching the housing 16 to the vehicle 10. As shown, an opening 42 may be provided for receiving a fastener. A chamfer 44 may be provided along a portion of the edge of opening 42 to help guide a fastener through the opening 42 for ease of assembly. Additionally, it is contemplated that chamfer 44 may help align the housing 16 with the vehicle 10 during assembly and may maintain alignment between the housing 16 and the vehicle 10 after the housing 16 is installed in and/or on the vehicle 10. Alternatively, any coupling means is contemplated for coupling the mounting bracket 30 to the vehicle 10 including, but not limited to, an integral attachment feature (i.e., snap-fit feature), adhesives, press-fitting, welding, and/or any combination thereof. Also provided on mounting bracket 30 are one or more elongated protrusions 40 for aligning the housing 16 with the vehicle 10 during assembly and maintaining alignment between the housing 16 and the vehicle 10 after the housing 16 is installed on the vehicle 10.

Figure 6:
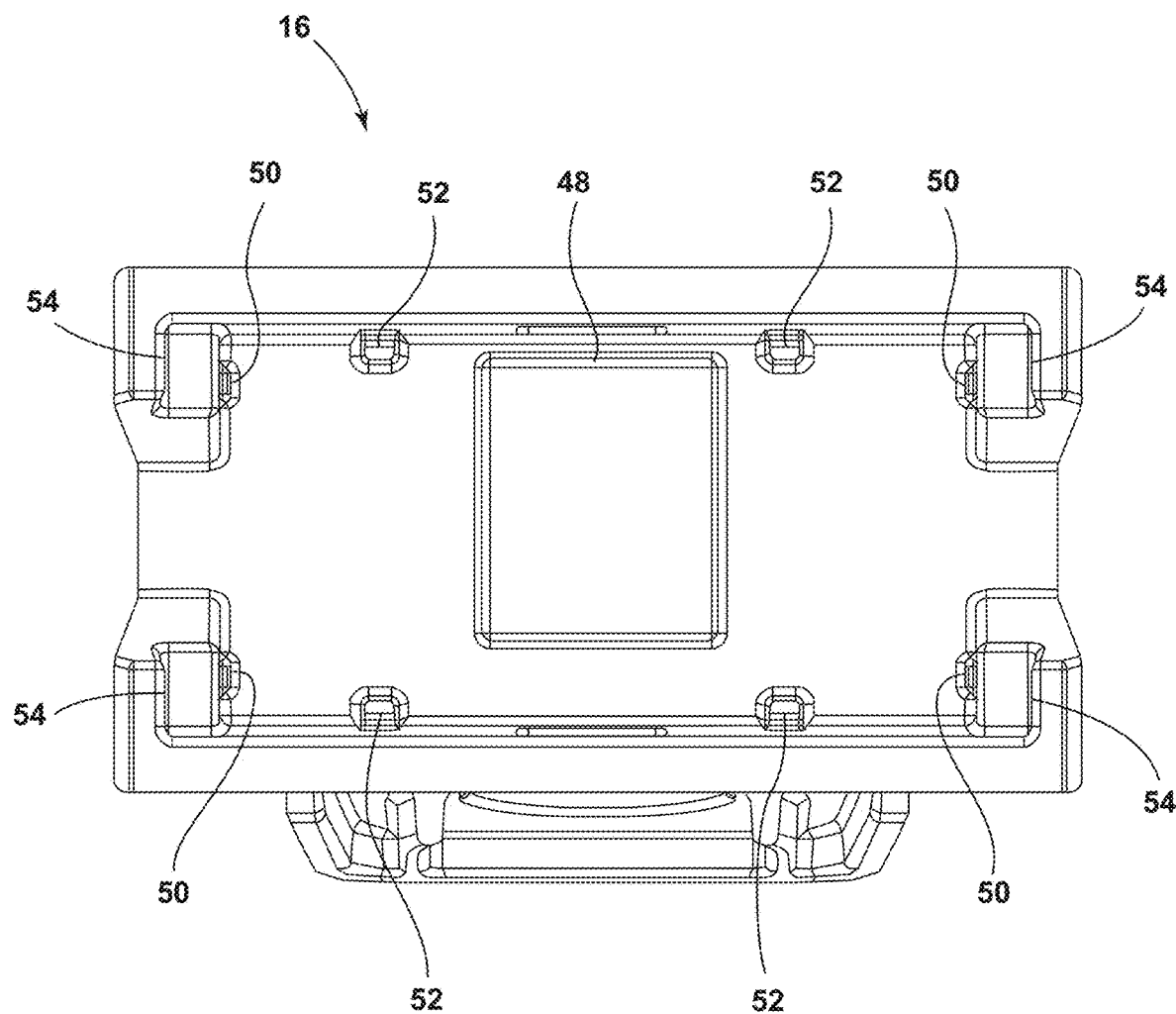
FIG. 6 is bottom elevational view of the housing of FIG. 4.

Referring now to FIG. 6, the interior space of the housing 16 may include one or more features for maintaining alignment of the circuit board 22 and/or the cover 18 of the light assembly 12.

In one example, the housing 16 may provide one or more ribs 50 positioned on an interior surface of the at least one side wall 32 and configured to align the circuit board 22 within the housing 16. The ribs 50 may allow for the circuit board 22 to be press-fit into the housing. One or more ribs 50 may include an abutment 52. The abutment 52 may provide a substantially horizontal surface configured to contact an upper surface of the circuit board 22 to align the circuit board 22 vertically within the housing. The abutment 52 may also be serve to protect electrical components 26 of the circuit board 22 by preventing contact between the electrical components 26 and an upper surface of the interior space.

The housing 16 may define a recess 48 in an upper surface of the interior space. The recess 48 is configured to receive one or more electrical components 26 of the circuit board 22 to prevent damage to the electrical components 26 caused by the electrical components 26 contacting the upper surface of the interior space. The recess 48 may also resolve packaging concerns by providing a decreased vertical clearance between the housing 16 and the circuit board 22. The recess 48 may also be sized such that it may receive one or more electrical components 26 for any orientation of the circuit board 22 as the circuit board 22 is rotated about a vertical axis relative to the housing 16.

The housing 16 may provide one or more braces 54 configured to contact the cover 18 during assembly to prevent upward movement of the cover 18. This may prevent damage to the circuit board 22 resulting from the circuit board 22 being pressed between the cover 18 and the housing 16. Additionally, the one or more braces 54 may be positioned within the housing 16 such that a bottom surface of the cover 18 may be substantially flush with a bottom surface of the at least one side wall 32 of the housing 16 such that, when assembled, the at least one side wall 32 may surround a portion of the periphery of the cover 18 to align and or maintain alignment between the cover 18 and the housing 16. It is also contemplated that the sides of the one or more braces 54 may overlap with the tab 56 and/or the one or more caps 58 (FIG. 7) to prevent light from exiting from cracks formed between the housing 16 and the cover 18. Consequently, the one or more ribs 50 on combination with the one or more braces 54 and the at least one side wall 32 may serve to align and maintain alignment between the light source 28 of the circuit board 22 and aperture 64 (FIG. 7) of the cover 18. Additionally, the overlap between the at least one side wall 32 and the cover 18 may prevent light from the light source 28 from exiting from cracks formed between the housing 16 and the cover 18.

Figure 7:
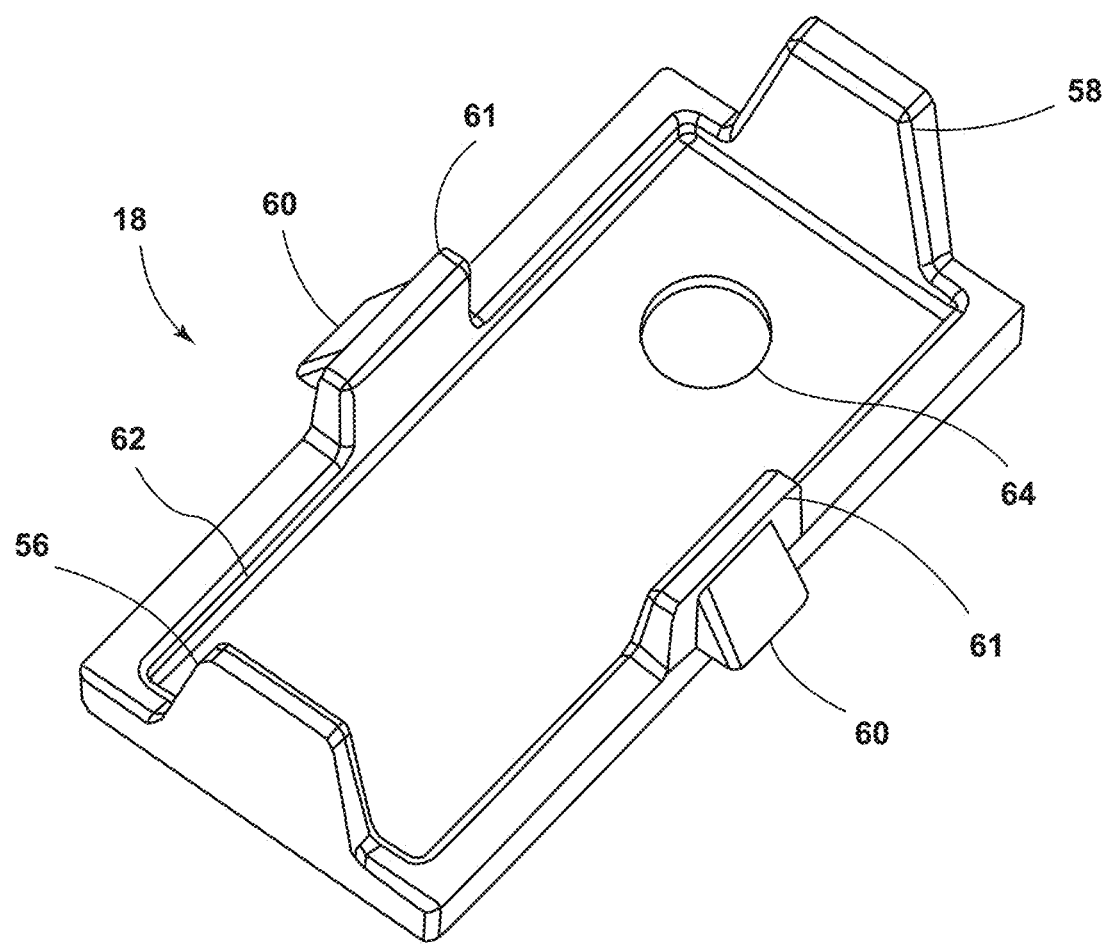
FIG. 7 is a perspective view of the cover of the light assembly, according to one example.
Figure 8:
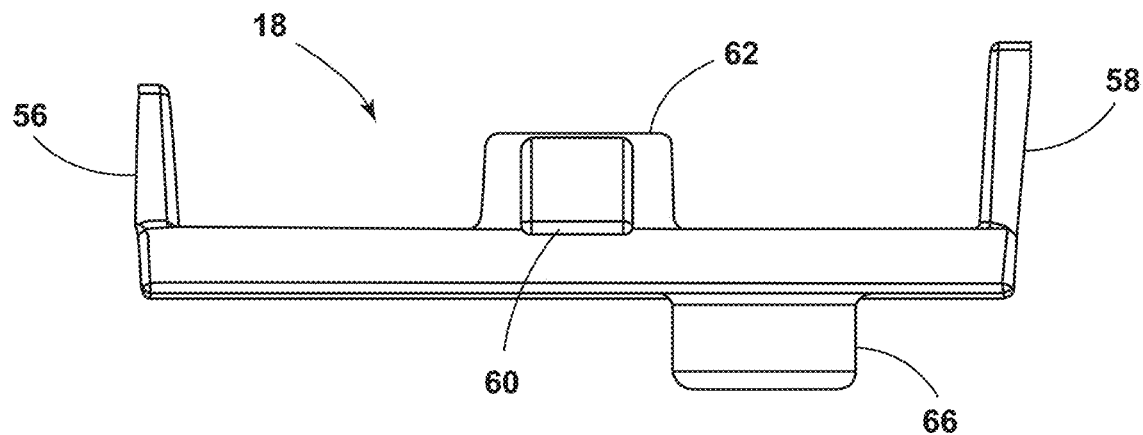
FIG. 8 is a front elevational view of the cover of FIG. 7.

Referring now to FIGS. 7 and 8, a cover 18 is provided. The cover 18 generally includes a lower surface defining an aperture 64, a tab 56, one or more caps 58, and one or more second attachment features 60. As discussed with reference to FIG. 4, a plurality of cutouts 34 may be provided on housing 16. By rotating the cover 18 relative to the housing 16 about a vertical axis, one of the plurality of cutouts 34 may be designated to define a gap through which the wires 24 may extend. This allows the light assembly 12 to be used in a variety of configurations (e.g., a left-hand configuration and a right-hand configuration). The tab 56 may couple with the designated cutout to define a gap through which the one or more wires 24 may extend. The tab 56 may extend slightly outward from the cover 18 such that the sides of the tab 56 may overlap with the sides of the designated cutout to prevent light from the light source 28 from escaping through cracks between the housing 16 and the cover 18. Also provided on the cover 18 are one or more caps 58 extending upward from the cover 18. The one or more caps 58 extend upward from the bottom surface of cover 18 and extend farther from the bottom surface than tab 56. The one or more caps 58 are configured to couple to the one or more non-designated cutouts of housing 16 to prevent light from escaping through the one or more non-designated cutouts. Additionally, the one or more caps 58 may extend slightly outward from the cover 18 such that the sides of the one or more caps 58 may overlap with the sides of the one or more non-designated cutouts to prevent light from the light source 28 from escaping through cracks between the housing 16 and the cover 18.

The one or more second attachment features 60 are provided to couple the cover 18 with the housing 16. The one or more second attachment features 60 may include an overlap 61 which may overlap with the housing 16 to prevent light from exiting through cracks formed between the housing 16 and the cover 18. As shown, the one or more second attachment features 60 may include a cantilevered integral attachment feature, however, any suitable structure for coupling the cover 18 to the housing 16 may be employed. This may include, but is not limited to, integral attachment features (i.e., snap-fit features), threaded and/or non-threaded holes for receiving a fastener, the use of an adhesive, the use or one or more welds, and other connectors by which the housing 16 and the cover 18 may be coupled, or any combination thereof.

The aperture 64 is further shown in FIG. 7 provided in cover 18. The aperture 64 may be aligned with the light source 28 of circuit board 22 such that the light from the light source 28 may be directed through the aperture 64. The aperture 64 may also include a frame 66 for receiving a lens. The lens may be optically coupled to the light source 28 and may direct focus or otherwise affect the light from the light source 28 output to the intended lighting area. This may include, but is not limited to, focusing, diffusing, diffracting, filtering, dispersing, and/or any combination thereof to produce a desired effect/pattern of the light exiting the light assembly 12.

The cover 18 may include a rim 62 defining a cavity for partially receiving the circuit board 22. This may resolve packaging concerns by providing a decreased vertical clearance between the circuit board 22 and the cover 18. Additionally, the rim 62 may contact an outer portion of the circuit board 22 to align and/or maintain alignment between the light source 28 of circuit board 22 and aperture 64. Alternatively, the rim 62 may be sized to receive a substantial portion or all of circuit board 22. The rim 62 may include one or more features (e.g., the rib and abutment features as disclosed in reference to FIG. 6) for aligning and/or maintaining alignment of the circuit board 22 with cover 18.

A variety of advantages may be derived from the use of the present disclosure. For example, the vehicle light assembly disclosed herein advantageously provides for lighting in or proximate to a vehicle in an assembly that can be used in a right-hand left-hand configuration. Moreover, the vehicle light assembly may include a mounting bracket having one or more features configured to maintain alignment between the housing and the vehicle. The vehicle light assembly may also be mounted on a surface substantially transverse to the circuit board and allow for the circuit board and cover to be coupled to the housing in a variety of orientations.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle assembly comprising:
   a housing comprising an upper surface, a mounting bracket extending from the upper surface for attaching the housing to a vehicle, at least one side wall defining an interior space configured to receive a circuit board, at least one designated cutout and at least one non-designated cutout; and
   a cover comprising a bottom surface having an aperture, a tab extending upward from the bottom surface, and one or more caps extending upward from the bottom surface, farther than the tab, wherein the cover is configured to couple to the housing in a plurality of configurations such that the tab and the designated cutout together define a gap through which one or more wires may extend, and the one or more caps couple with the non-designated cutouts to provide a substantially light-tight fit.

2. The vehicle assembly of claim 1, wherein the housing further comprises one or more first attachment features symmetrically positioned about the housing and the cover further comprises a plurality of second attachment features symmetrically positioned about the cover wherein the plurality of second attachment features are configured to couple to the one or more first attachment features in a plurality of orientations of the cover relative to the housing.

3. The vehicle assembly of claim 1, wherein the housing further comprises one or more braces provided on an interior surface of the housing and configured to maintain the position of the cover relative to the housing wherein the sides of the one or more braces are configured to overlap the sides of the tab and the one or more caps to prevent light from exiting through cracks formed between the housing and the cover.

4. The vehicle assembly of claim 1, wherein the tab and the one or more caps extend away from the cover and overlap with the at least one side wall to provide a substantially light-tight fit.

5. The vehicle assembly of claim 1, wherein the at least one side wall overlaps with the sides of the cover to provide a substantially light-tight fit.

6. The vehicle assembly of claim 1, wherein the cover further comprises a cavity configured to partially receive a circuit board.

7. A vehicle light assembly comprising:
   a circuit board having one or more wires extending therefrom;
   a light source operably connected to the circuit board;
   a housing comprising an upper surface, a mounting bracket extending from the upper surface for attaching the housing to a vehicle, at least one side wall defining an interior space configured to receive the circuit board, and first and second cutouts formed in the side wall opposite one another; and
   a cover comprising a bottom surface having an aperture, a tab extending upward from the bottom surface, and a cap extending upward from the bottom surface opposite and farther than the tab, wherein the cover and the circuit board are configured to selectively couple to the housing such that the tab couples one of the first and second cutouts to define a gap through which the one or more wires extend, and the cap couples with the other of the first and second cutouts to prevent light from exiting through the other of the first and second cutouts.

8. The vehicle light assembly of claim 7, wherein the mounting bracket further comprises one or more elongated protrusions configured to maintain alignment of the housing relative to the vehicle.

9. The vehicle light assembly of claim 7, wherein the mounting bracket extends from the upper surface substantially transverse to the circuit board.

10. The vehicle light assembly of claim 7, wherein the housing further comprises a recess formed in an interior surface of the housing and configured to accommodate one or more electrical components of the circuit board.

11. The vehicle light assembly of claim 7, wherein the cover further comprises a cavity for partially receiving the circuit board.

12. The vehicle light assembly of claim 7, wherein the housing further comprises at least one rib configured to maintain horizontal alignment of the circuit board relative to the housing.

13. The vehicle light assembly of claim 12, wherein the at least one rib further comprises at least one abutment configured to maintain a vertical clearance of the circuit board relative to the housing.

14. The vehicle light assembly of claim 7, wherein the housing further comprises one or more braces provided on an interior surface of the housing and configured to contact the cover during assembly to maintain vertical clearance of the cover relative to the housing.

15. The vehicle light assembly of claim 14, wherein the one or more braces are configured to overlap with the sides of at least one of the tab and cap to prevent light from escaping from cracks defined between the housing and the cover.

16. A vehicle light assembly comprising:
a circuit board having one or more wires extending therefrom;
a light source operably connected to the circuit board;
a housing comprising an upper surface, a mounting bracket extending from the upper surface for attaching the housing to a vehicle, at least one side wall defining an interior space configured to receive the circuit board, at least one designated cutout and at least one non-designated cutout; and
a cover comprising a bottom surface having an aperture, a tab extending upward from the bottom surface, and one or more caps extending upward from the bottom surface opposite and farther than the tab, wherein the cover and the circuit board are configured to selectively couple to the housing such that the tab couples the designated cutout to define a gap through which the one or more wires extend, and the one or more caps couple with the one or more non-designated cutouts to prevent light from exiting through the one or more non-designated cutouts.

17. The vehicle light assembly of claim 16, wherein the mounting bracket extends from the housing at a substantially non-zero angle relative to the circuit board to direct light emitted from the vehicle light assembly in a desired direction.

18. The vehicle light assembly of claim 16, wherein the mounting bracket further comprises an opening for receiving a fastener comprising a chamfer along a portion of the periphery of the opening for directing the fastener through the opening during assembly.

19. The vehicle light assembly of claim 16, wherein the mounting bracket further comprises one or more elongated protrusions configured to maintain alignment of the housing relative to the vehicle.

20. The vehicle light assembly of claim 16, wherein the housing and the cover are configured to couple together such that the circuit board is completely enclosed.

* * * * *